United States Patent Office 2,769,458
Patented Nov. 6, 1956

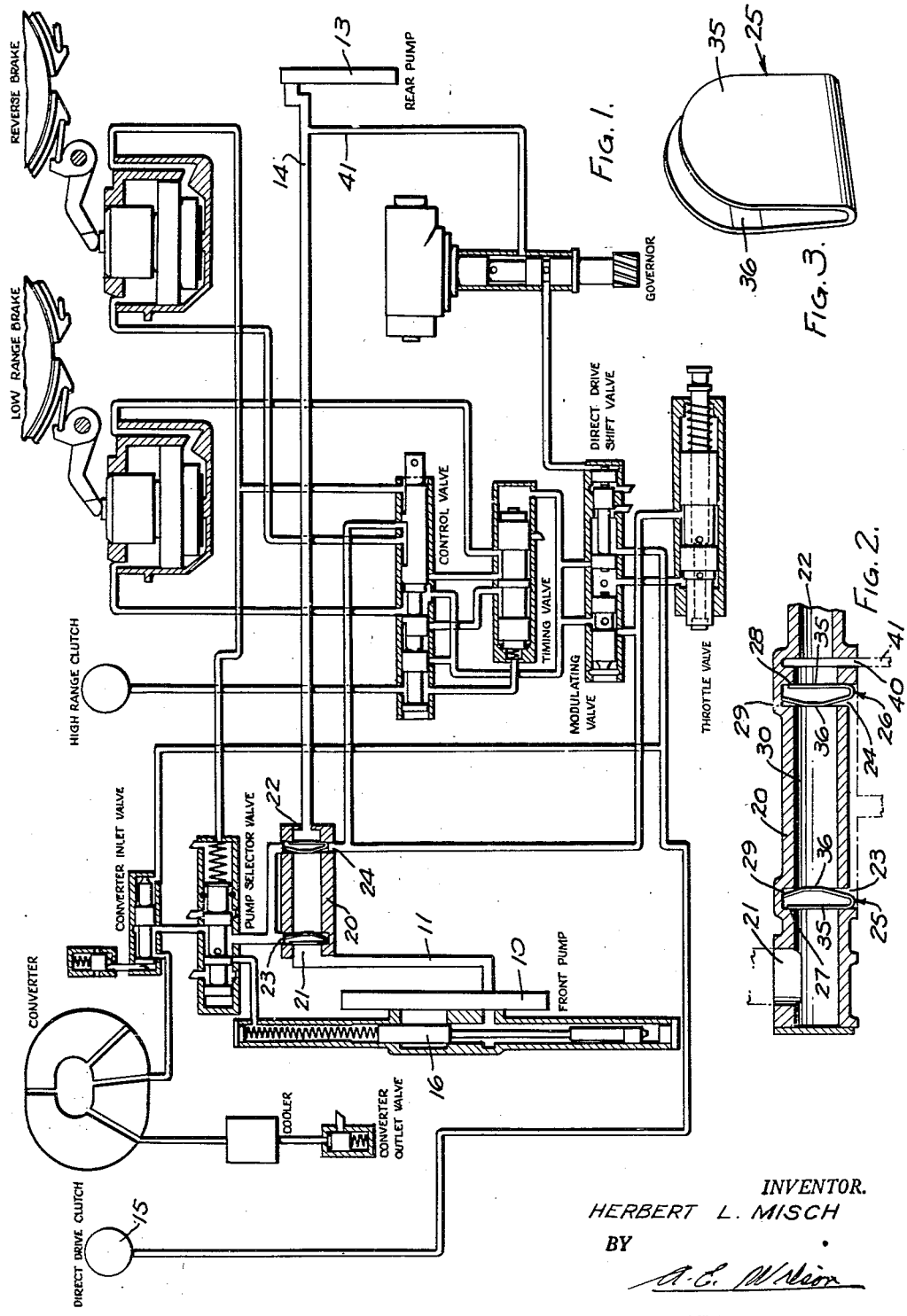

2,769,458

PUMP CHECK VALVE

Herbert L. Misch, Royal Oak, Mich., assignor to Studebaker-Packard Corporation, a corporation of Michigan Application October 28, 1952, Serial No. 317,285

5 Claims. (Cl. 137—512)

This invention relates to fluid handling means and more particularly to hydraulic valve means for use in the control system of an automatic transmission device or the like.

Several of the conventional automatic transmission means now used on automobiles make use of a dual pump system that cooperates with a hydraulic control mechanism. In such systems, one pump is driven by the input to the transmission of the car and another pump is driven by the tail shaft or output from the transmission. These two pumps are usually designed to have different operating characteristics so that when the automobile is moving slowly as in starting up, the input driven or front pump, will supply a relatively large volume of fluid to render the controls operative. The rear or tailshaft driven pump is somewhat smaller than the front pump, but it is designed to operate at a higher speed and pressure to produce a sufficient volume of output to override the front pump and maintain the proper functioning of the controls during normal driving. This dual pump system thus provides two pumps having different characteristics so that the pump can be energized which operates more efficiently for the particular driving conditions prevailing at any given time. The system also makes it possible to so arrange the hydraulic controls that under unusual conditions, the rear pump may be driven by the driving wheels of the car to actuate the controls and driving gear in order that, if necessary, the car may be pushed to turn the motor over in an attempt to start it.

In one type of such a transmission, in order to automatically render the front and rear pumps alternatively operative depending upon predetermined conditions, the output of each pump is delivered to a common valve casing having suitable check valve means therein. The valve functions in a manner to permit a fluid flow to take place into the automatic control system from the pump that is then pumping hydraulic fluid at the highest pressure. This invention is concerned with this check valve means and provides an improved valve for cooperating between the pumps to effect proper delivery of the pressure fluid to the control system.

The improved structure provides a very light weight spring form of check valve means which is substantially instantaneously responsive to the front and rear pump pressures. Further, the check valve means is designed to cooperate with the hydraulic fluid and the valve casing so as to be quite silent in operation.

The preferred form of this invention is shown in the drawing wherein,

Fig. 1 is a diagrammatic representation of a typical hydraulic control system wherein the check valve means of this invention might be used;

Fig. 2 is a cross sectional view of a valve casing with the check valve means of this invention positioned therein; and Fig. 3 is a perspective view of one of the check valve means.

Referring to Fig. 1, there is shown the front pump that is adapted to be driven by any suitable means from the crankshaft of the engine of the automobile. The pump 10 is operative at relatively slow speeds, as when starting up, to deliver a sufficient volume of fluid through its outlet 11 to supply a torque converter 12 with pressure fluid and to also energize the various valve means of the control system which are designed to effect automatic operation of the several servo motors for controlling the application of the engine torque to the driving wheels. As the speed of the automobile builds up, a rear pump 13 which is driven by the output shaft from the automatic transmission, and which is responsive to the speed of rotation of the rear wheels, also delivers a supply of fluid into its output conduit 14.

In the form of automatic transmission here shown, the front pump 10 is designed to operate at relatively low speeds to deliver a sufficient volume of fluid to fill the automatic control system and maintain a sufficiently large volume of flow through the torque converter to keep the converter cool as the converter is used to drive the car. The rear pump 13 on the other hand, operates at relatively higher speeds at which time the power flow through the torque converter may be by-passed by the engagement of a direct drive friction clutch 15 so that a smaller volume of fluid flow will suffice. Further, as the speed of the automobile builds up, a smaller pump may be operated at a higher speed to more efficiently deliver a proper volume of fluid at the optimum pressure to operate the system. To meet these conditions of operation, the larger front pump 10 is provided with a pressure relief valve 16 which permits the fluid flow from pump 10 to reach a steady upper pressure and thereafter any excessive fluid from the pump 10 is by-passed. With such an arrangement, when the rear pump 13 is driven to operate at a higher pressure as is usually the case, during normal operation above a certain preselected speed and except when starting up or driving in reverse, the rear pump 13 is operative to supply all of the fluid to the control system and torque converter while front pump 10 runs idly.

The check valve means of this invention is provided to accomplish the connection of either the front or rear pump to the hydraulic system depending upon whichever pump generates the higher pressure and provides automatic control means for delivering the higher pressure fluid from one or the other of these pumps into the circuit.

For this purpose the output flow from the front pump and the output flow from the rear pump are delivered into opposite ends respectively of the check valve casing 20, the front pump inlet 21 feeding the fluid into one end thereof and the fluid under rear pump pressure being delivered into the valve casing through the inlet 22. The casing 20 is provided with one or more outlet openings such as 23 and 24 which communicate with the hydraulic system and through which fluid under pump pressure is supplied to the valves and torque converter. The various valve control means and their connections are disclosed in the following copending applications and form no part of the present invention which is concerned only with the structure of the check valve means for effecting selective delivery of front or rear pump pressure fluid to the controls:

71,128, McFarland, January 15, 1950 now Patent Number 2,694,948 issued November 23, 1954.

148,022, Lucia, March 7, 1950 now Patent Number 2,693,260 issued November 11, 1954.

171,690, McFarland, July 1, 1950 now Patent Number 2,689,029 issued September 14, 1954.

172,659, McFarland, July 8, 1950 now Patent Number 2,693,810 issued November 9, 1954.

173,789, McFarland, July 14, 1950.

176,391, McFarland, July 28, 1950 now Patent Number 2,691,940 issued October 19, 1954.

178,975, McFarland, August 11, 1950 now Patent Number 2,670,828 issued March 2, 1954.

258,771, Lucia, November 28, 1951 now Patent Number 2,728,427 issued December 27, 1955.

The improved check valve means of this invention is positioned within the valve casing 20 and the check valves, as is best seen in Fig. 2, are situated to cooperate with valve seats located between the inlet 21 and the outlet 23 and between the inlet 22 and outlet 24.

The check valve means of this invention, preferably takes the form of a generally U shaped leaf 25 adapted to be disposed in the valve casing 20 adjacent the inlet 21 and an identical U shaped leaf 26 disposed in casing 20 adjacent inlet 22. Valve 25 is adapted to cooperate with a seat 27 and valve 26 cooperates with a seat 28, the seats 27 and 28 preferably being formed by cutting slots 29 in the valve casing 20 which slots have parallel sides that intersect the fluid passage 30 at approximately right angles, which passage connects the valve casing inlets 21 and 22.

Each of the U shaped leaf members 25 and 26 may be formed to an identical pattern and each valve element has a flat face 35 which is adapted to bear against the valve seats 27 and 28. Arm 36 of the U shaped leaf valve means is formed to have a non-planar surface so that it cannot close off the face of the slot 29 opposite to the valve seats 27 or 28 for a purpose that will appear more fully below. The body of the leaf valve is designed to have just sufficient width to be slipped into slot 29 while having a little play with respect to the sides of the slot so that the valve surface 35 may move away from its cooperating seat to open when the pressure builds up. When either of the valves opens, fluid may flow from the inlet adjacent thereto, into the passage 30 and then out the outlet means leading from the casing.

In the operation of this mechanism, when the engine of the automobile is started up, the front pump begins to rotate and the volume and pressure of the fluid flowing therefrom builds up. As the motor is speeded up, a sufficient quantity of fluid is quickly supplied from the relatively large volume front pump which fluid fills the converter and all of the conduits of the control system. As long as the automobile remains stationary with the engine running, all of the fluid delivered from the front pump passes through conduit 11 and a portion of its pressure is exerted against the face 35 of the leaf valve 25 to open the valve so that pressure fluid flows into the conduit 30 and against the rear of valve 26. Since there is no pressure being generated by the motionless rear pump 13, the valve 26 remains closed and the front pump supplies pressure fluid through the outlet conduits 23 and 24 from the valve casing 20 to fill the system and furnish fluid to the torque converter.

When the engine of the automobile is speeded up and the car begins to move the rear pump 13 is driven and fluid from pump 13 gradually builds up to be delivered through conduit 14 against the face of valve 26. The valve 26 however remains closed until the pressure from the rear pump 13 is greater than the pressure developed against the rear side thereof by the front pump 10. As soon as the pressure in conduit 14 and inlet 22 of the valve casing builds up to a degree higher than the pressure prevailing in conduit 30, the valve 26 opens and the higher pressure is instantaneously delivered against the rear face of valve 25 to close it. The fluid is then supplied to the conduit 30 in valve 20 from feed line 14 through inlet 22 and valve 25 which faces toward the front pump is maintained closed.

Since the check valve means here disclosed may be made of a light gage spring steel, it is apparent that the check valve system here disclosed will be extremely sensitive and substantially instantaneous responsive to variations resulting from the simultaneous operation of the front and rear pumps.

In practice, the front pump is usually provided with a pressure relief valve as explained above so that this relatively larger pump need not be operated in a manner to supply excessive fluid when the automobile is in normal motion thereby saving considerable energy. The check valve system here disclosed thus cooperates with this front pump pressure relief means to insure the rapid and positive takeover of the fluid pumping function by the rear pump 13 as soon as the hydraulic pressure from the rear pump builds up.

In the unusual instance where the motor of the automobile may be hard to start and it is desired to push the car to turn over the engine, it is apparent that the front pump 10 will remain stationary while the rear pump 13 is driven by rotation of the rear wheels of the car when it is pushed. While the front pump remains inactive, pressure is delivered from the rear pump 13 through conduit 14 to inlet 22 and as there is no front pump pressure in conduit 30 at this time, the valve 26 will open and pressure fluid will flow into conduit 30 from inlet 22. The valve 25 will remain closed because of the rear pump pressure exerted against its backside, however, although somewhat inefficient, pump 13 will in this manner supply a flow of pressure fluid to the hydraulic control system and converter so that the engine can be turned over in an attempt to start it by means of pushing the car.

Referring to Fig. 2, it will be seen that valve casing 20 has a third outlet passage 40 formed therein which communicates directly with inlet 22 in front of the check valve 26. Outlet 40 leads to conduit 41, shown diagrammatically in Fig. 1, adjacent pump 13, to supply pressure fluid to the governor and the valve associated therewith, the operation of which will appear more fully in the aforementioned application, Serial No. 172,659 now Patent No. 2,693,810.

The above description covers the preferred form and operation of this invention. It will be apparent to those skilled in the art that modifications thereof may be made which will fall within the scope of the following claims.

I claim:

1. A valve device comprising a housing having two spaced apart inlets communicating with the interior thereof, outlet means communicating with said interior, said outlet means comprising a pair of spaced apart annular slots formed about said interior between the spaced inlets, a U-shaped valve member seated in each slot, said valve member being formed of resilient material and having the opposite sides thereof biased away from each other into engaging relation with the sides of the associated slot, said valve member comprising one flat side seated against the side of the slot adjacent the associated inlet for selectively sealing said inlet from the outlet and a bow shaped side engaging in part with the other side of said slot for permitting continuous communication between the adjoining portion of the interior of the housing and the outlet.

2. A valve device comprising a housing having two spaced apart inlets communicating with the interior thereof, outlet means for said housing comprising a pair of spaced apart annular slots formed about said interior between the spaced inlets, a resilient U-shaped valve member seated in each slot with the opposite sides thereof biased away from each other into engaging relation with the sides of the associated slot, said valve member comprising one flat side seated against the side of the slot adjacent its associated inlet for selectively sealing said inlet from the outlet and a bow shaped side engaging in part with the other side of said slot for permitting continuous communication between the adjoining portion of the interior of the housing and the outlet.

3. A valve device comprising a housing having two spaced apart inlets communicating with the interior thereof, an outlet communicating with the interior of said housing and including a slot formed annularly about the inner surface of said housing, a U-shaped resilient valve member having the sides thereof biased into engaging relation with the sides of said slot, said valve member comprising one flat side adapted to seat against one side of said slot for interrupting the communicating relation from one inlet to the outlet and a bow shaped side partially engaging with said other side of said slot for permitting continuous communication between the other inlet and the outlet.

4. A valve device comprising a housing having at least one inlet and an outlet communicating with the interior thereof, said outlet including a slot formed annularly about the inner surface of said housing so that a portion of said inner surface is on the inlet side of said slot and another portion of said surface is beyond said slot, a U-shaped valve member seated in said slot and comprising one flat portion adapted to seat against one side of said slot and a bow shaped portion engaging in part with said other side of said slot whereby the flat portion of the valve can interrupt the communicating relation with the outlet and the bow shaped portion can permit continuous communicating relation between the outlet and the portion of the interior of the housing beyond the slot.

5. A valve device comprising a housing having two spaced apart inlets and an outlet communicating with the interior thereof, said outlet including a slot formed annularly about the inner surface of said housing, a U-shaped valve member seated in said slot and comprising one flat portion seated against one side of said slot and a bow shaped portion engaging in part with said other side of said slot whereby the flat portion of the valve can interrupt the communicating relation from one inlet to the outlet and the bow shaped portion can permit continuous communicating relation from the other inlet to the outlet.

References Cited in the file of this patent

UNITED STATES PATENTS

| | | |
|---|---|---|
| 303,702 | Carricaburu | Aug. 19, 1884 |
| 310,935 | Fell | Jan. 20, 1885 |
| 978,152 | Gutermuth | Dec. 13, 1910 |
| 1,229,457 | Hildebrand | June 12, 1917 |
| 1,594,168 | Goff | July 27, 1926 |
| 1,697,004 | Gutermuth | Jan. 1, 1929 |
| 1,791,449 | Kennedy | Feb. 3, 1931 |
| 1,938,369 | Beebe | Dec. 5, 1933 |
| 2,065,062 | Dugelay | Dec. 22, 1936 |
| 2,599,499 | Thorstenson | June 3, 1952 |

FOREIGN PATENTS

| | | |
|---|---|---|
| 9,764 | Great Britain | 1913 |
| 18,175 | Great Britain | 1906 |
| 488,924 | Great Britain | July 12, 1938 |